United States Patent Office 3,618,371
Patented Nov. 9, 1971

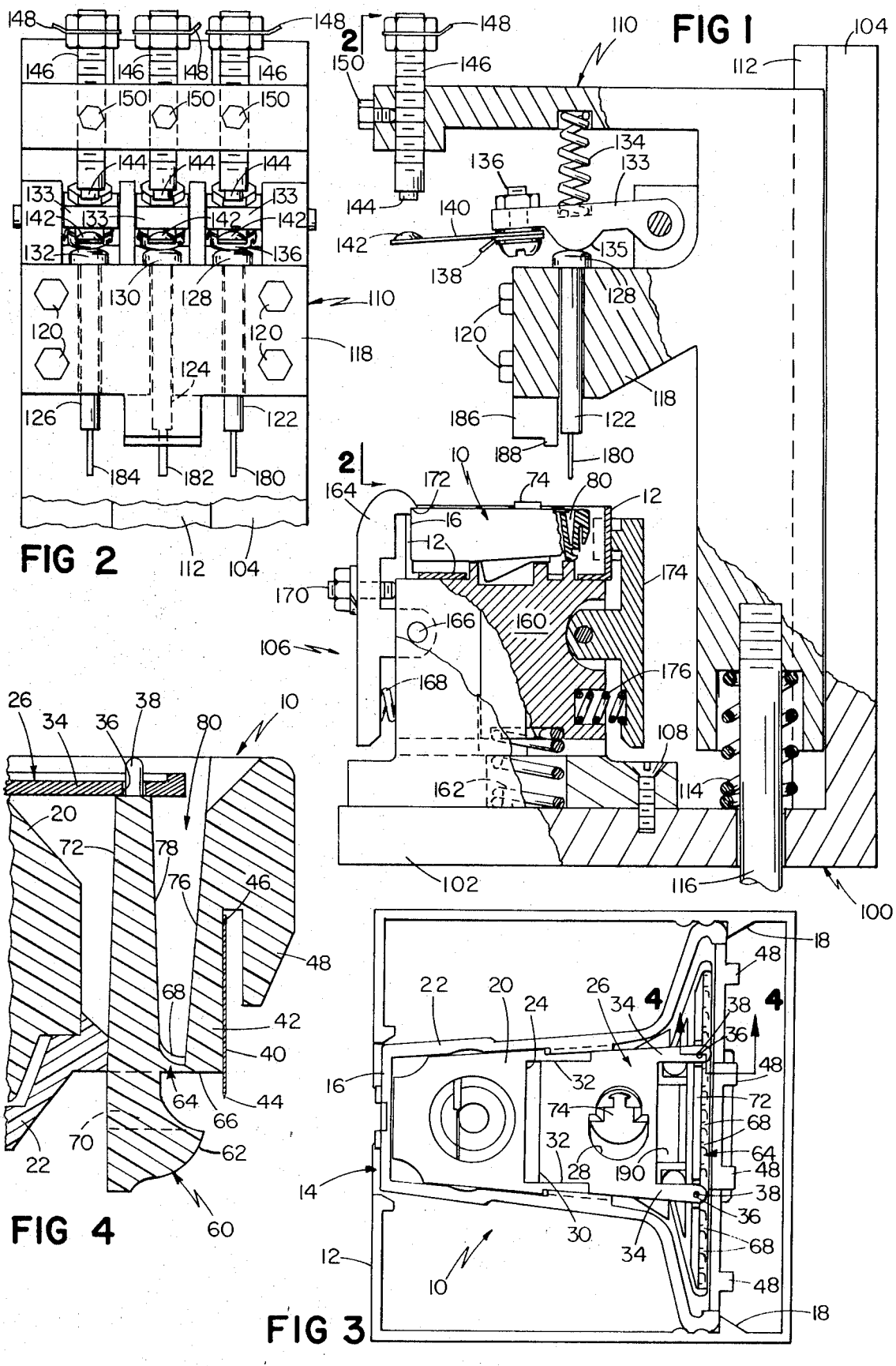

3,618,371
METHOD AND APPARATUS FOR TESTING RESILIENT STRUCTURES
Frank S. Martin, Wenham, Mass., assignor to The Gillette Company, Boston, Mass.
Filed Aug. 21, 1969, Ser. No. 852,046
Int. Cl. G01n 3/00
U.S. Cl. 73—100     3 Claims

ABSTRACT OF THE DISCLOSURE

Apparatus for testing a web section which connects two spaced members of an integral molded resilient structure includes a support constructed to receive the structure so that the connecting web is free to flex under the influence of a stressing force. A testing head which includes a probe for engagement with at least one of the spaced members is inserted for movement toward the support so that the probe will engage that member and flex the web. Movement of the probe relative to the testing head is sensed and provides an indication of the structural integrity of the web.

SUMMARY OF INVENTION

This invention relates to method for testing the structural soundness of a component of a resilient structure.

Resilient structures, such as those that are molded of organic polymeric materials, frequently include a thin section whose strength and/or integrity must be verified. A particular problem arises in connection with a molded component of a razor blade cartridge in which a protective guard member is disposed in front of the sharpened edge of the razor blade and defines the shaving geometry of the razor. This guard is supported on a web component that is thin enough to function as a hinge and permit movement of the guard structure for adjustment of the shaving geometry of the razor, while strong enough to maintain the desired range of shaving geometry with precision and reproduceability. The shaving geometry over the range of settings of the adjustment should be uniform throughout the shaving zone, and for commercial acceptability it is important that the hinge web not be cracked or otherwise undesirably weakened.

It is an object of this invention to provide a novel and improved method for the economical and efficient testing of web sections of resilient structures.

Another object of the invention is to provide a reliable method of testing a hinge web component of a structure manufactured from an organic polymeric material.

Another object of the invention is to provide novel and improved methods for efficiently and economically testing the structural integrity of a resilient web in a mass production system.

Another object of the invention is to provide novel and improved methods for efficiently and economically testing the structural integrity of a web section that connects two opposed surfaces so that a tapered recess is defined between the two surfaces.

In accordance with the invention, there is provided a method of testing a flexible web which connects two spaced members of an integral molded resilient structure which comprises the steps of supporting at least one of the members in a predetermined position, inserting a probe to produce relative motion between the two spaced member sto stress the web, and sensing the correlation between the force applied to the probe and the distortion of the structure. A measure of the integrity of the web can be obtained either by applying a known force to one or both members and sensing the distortion of the structure, or by distorting the structure a predetermined amount and sensing the force required to produce that distortion.

An apparatus for practicing the invention includes a support constructed to receive the resilient structure to be tested so that the connecting web is free to flex under the influence of a stressing force, a testing head including a probe for engagement with at least one of the members connected by the web, means for causing relative movement of the support and the probe so that the proble engages one or both members to cause flexure of the web, and means for sensing the resulting applied force-web deflection interaction to provide a measure of a characteristic of the structure. In particular embodiments, the probe is mounted for sliding movement relative to the testing head and the sensing means senses the movement of the probe relative to the testing head. The apparatus includes a stop for limiting the relative movement between the testing head and the support. The sensing means includes a first electrical contact fixed on the testing head and a second electrical contact mounted for movement with the probe.

The invention has particular utility in evaluating a structure in which the two spaced members are two opposed walls of a recess that tapers at an angle of less than 10° and has a depth at least five times the width of the recess at its narrower end where the web section hingedly connects the two walls. In an embodiment employed for the testing of a molded component of a razor blade cartridge, the cartridge has a recess with a taper of about 7° and a depth of about ten times the width of the recess at its narrower end. That recess is elongated and open at both ends and three probes are mounted in spaced relation on the testing head for insertion into the recess. Each contact mounted for movement with the probe is pivotally mounted on the testing head and biased into engagement with its probe by a separate spring. The center probe has a slightly greater width and a stronger biasing spring than either outer probe.

The invention permits testing of the integrity of the hinge web directly in the production line after the cartridge components have been assembled. Thus, fracture of the hinge, should that occur during assembly, is detected. The testing mechanism is set up to require that the web have sufficient resistance to cause all three electrical circuits to close. Should any one of the probes not close an electric circuit, the web is considered defective and the assembled cartridge is discarded. This method of testing the web provides reliable evaluation of the quality of the web section rapidly and with greater accuracy than testing techniques heretofore employed.

Other objects, features, and advantages will appear from the following description of a particular embodiment of the invention, taken together with the attached drawings thereof. This description of a particular embodiment is in an illustrative and not a limiting sense as other embodiments of the invention will be apparent to those skilled in the art. In the drawings:

FIG. 1 is a side elevation, partially in section, of a testing apparatus for practicing the invention;

FIG. 2 is a front elevation of a portion of the apparatus of FIG. 1;

FIG. 3 is a plan view of the item being tested by the apparatus of FIG. 1; and

FIG. 4 is a magnification of a view taken at 4—4 of FIG. 3.

DESCRIPTION OF A PARTICULAR EMBODIMENT

The drawings illustrate apparatus designed to assess the structural soundness of a resilient hinge web. It will be apparent, however, that other tests and other structures are within the principles to be described. The specific resilient hinge web which the apparatus depicted is designed to test is incorporated in a razor blade magazine which includes a variable shaving geometry mechanism. Such a magazine, illustrated in FIG. 3, is described in detail in U.S. Pat. 3,375,578, issued on Apr. 2, 1968, entitled "Safety Razors." The description of the magazine, and especially of the resilient hinge web therein which is to be tested, will precede the description of the testing apparatus since various details of the latter are dependent upon the configuration of the magazine and hinge.

As shown in FIG. 3 the magazine 10 is mounted within an open-topped rectangular container 12. The container 12 has an aperture 14 at the center of one end thereof to permit the application of pressure to the bottom end 16 of the magazine 10 so as to force the magazine against ribs 18 on the inner surfaces of the container side walls thereby precisely locating the magazine within the container. Studs (not shown) integral with the floor of the container precisely define the depth of the magazine 10 within the container 12.

The magazine 10 includes a back member 20 and a front member 22. On the back member 20 of the magazine is formed a recess 24 in which is disposed a guide plate 26. This guide plate has a main body portion in which is disposed an aperture 28; a depending foot 30 having parallel side walls 32; and two upstanding arms 34, each of which has an aperture 36 in its upper end in which is received a projecting pin 38 of the variable shaving geometry mechanism.

The variable geometry portion of the razor blade magazine, which includes the resilient hinge web to be tested for structural soundness, is illustrated in greater detail in FIG. 4. Blade 40, supported on blade support platform 42, in this embodiment is a strip of stainless steel 0.0015 inch in thickness and 0.1895 inch in width having a sharpened forward edge 44 and an unsharpened rear edge 46. Disposed above the blade support platform 42 and extending forwardly over that platform are a series of four spaced tabs 48 which act as guides contributing to the definition of the path of the blade 40 through the shaving zone defined by the blade support platform 42. Below the blade support platform is formed a guard structure 60 that includes a guard surface 62 at its forward end. This guard structure is secured to the blade support platform by a web hinge element 64 which is secured to the blade support platform at the front edge 66 of that platform. This hinge web 64 in the illustrated embodiment is an imperforate web 0.005 inch in depth which is reinforced by sixteen rib elements 68, each of which has a depth of 0.015 inch and a width of 0.030 inch, and which are spaced 0.060 inch apart.

As best shown in FIG. 4, the undersurface 76 of blade support platform 42 and the upper surface 78 of adjusting lever element 72 cooperate to form a tapered recess 80 with hinge web 64 at the narrow end thereof. The width of the tapered recess 80 at its narrow end is approximately 0.025 inch, surface 76 is tapered at an angle of about 5° and surface 78 is tapered at an angle of about 2° so that the angle between surfaces 76 and 78 is about 7°. The depth of the recess is about 0.280 inch and the recess is about 1½ inches long.

Slots 70 are provided in the guard structure between guard surface 62 and front edge 66 to permit movement of hair elements or other debris that might accumulate during the shaving operation away from the shaving zone. Extending rearwardly from hinge web 64 and integral therewith is an adjusting lever element 72 in the form of a flat elongated member that has a pair of pins 38 projecting from its rear surface. The blade support platform 42, hinge web 64, and adjusting lever element 72 are manufactured of a moldable organic plastic capable of being subjected to repeated deformation stresses. A suitable plastic material is an acetyl plastic sold under the name Celcon.

The variable geometry mechanism is actuated by rotation of a cam element 74 within aperture 28 of guide plate 26, thus causing the guide plate to slide within recess 24 formed on the back member 20. This motion is transmitted to adjusting lever element 72 and thereby to guard structure 60. The movement of adjusting lever element 72 also causes flexure of the resilient hinge web 64.

As mentioned above, hinge web 64 is reinforced with sixteen rib elements 68 which are equally spaced along the length thereof. It has been found that a single broken rib element 68 near the end of hinge web 64, or a plurality of broken rib elements 68 near the center thereof, will sufficiently affect the variable shaving geometry mechanism so that the razor blade magazine must be deemed defective. The testing apparatus illustrated in FIGS. 1 and 2 is designed to test the structural soundness of the hinge web 64, and the rib elements 68, so that defective magazine may be identified. The testing apparatus tests the integrity of these elements by forcing three spaced probe members into tapered recess 80 so as to spread the blade support platform 42 and the adjusting lever element 72 to flex hinge web 64. As further described below, the resistance to flexure of hinge web 64 indicates the structural soundness thereof.

As shown in FIG. 1, the testing apparatus comprises a frame member 100 having a horizontal base portion 102 and an upstanding arm portion 104. A holder 106 for the magazine structure to be tested is secured upon the base 102 by means of screws 108. A head structure 110 is slidably mounted on arm 104 by means of a groove which mates with dovetail guide ridge 112. The head structure 110 is biased upwardly by spring 114 and relative movement of head 110 and holder 106 is caused by application of an adjustable downward force, in any suitable fashion, to plunger 116.

A probe support member 118 is attached to the main body of testing head 110 by means of bolts 120. Three probes 122, 124, and 126 are mounted, in slidable relation to probe support member 118, in vertical channels therein (see also FIG. 2), and are supported by flanges 128, 130, and 132. Above each probe is an arm 133 pivotally mounted on head 110 and biased downwardly by spring 134 so that projection 135 rests upon the corresponding probe flange. Bolts 136 in the forward ends of arms 133 secure leads 138 and electrically conducting strips 140 (which have electrical contacts 142 mounted on their upper surfaces) to arms 133.

Above and aligned with contacts 142 are tips 144 of studs 146 which are supported on head structure 110. Electrical leads 148 are secured in electrical contact with studs 146. The precise positions of studs 146, and thus the distance which contacts 142 must travel to make contact, are maintained by set screws 150. For this particular hinge web and these probes, this distance is set at 9/32 inch.

Holder 106 receives container 12 so that tapered recess 80 of razor blade magazine 10 in container 12 is directly below probes 122, 124 and 126. Holder 106 includes a body portion 160 which is resiliently supported by spring 162 to accommodate over-travel of testing head 110. Latch member 164, attached to body portion 160 at pivot 166, 164 is biased by spring 168 and its motion is limited by stop 170. Notch 172 in latch member 164 bears against the bottom end 16 of the razor blade magazine 10 and pressure are 174 (biased by spring 176) engages container 12 so that the magazine is forced against ribs 18 in container 12, thereby precisely locating the magazine 10 with respect to the probes 122, 124 and 126. The relative strength of springs 168 and 176 are such that spring 168 overbalances spring 176 and maintains stop 170 against holder body 160, while spring 176 has sufficient force to cause pressure arm 174 to firmly urge container 12 to the location determined by the setting of stop 170.

The tips 180, 182, and 184 of probes 122, 124 and 126 are of generally rectangular cross section. Tips 180 and 184 each have a stressing dimension of 0.0443 inch, and a width of 0.062 inch while tip 182 has a stressing dimension of 0.0473 inch and a width of 0.062 inch. The hinge structure of the magazine (web 64) offers greater resistance to deflection under the influence of a probe tip in the center of magazine 10 than at the ends thereof. This is due, in part, to the engagement of pins 38 with apertures 36 in guide plate 26. For this reason the center probe end 182 has a greater stressing dimension than the exterior probe ends 180 and 184. For this same reason the force exerted by the center spring 134 is greater than that for the two outer springs 134; the specific values being 21 oz. for the center spring and 12 oz. for each outer spring.

In operation, the relative downward motion of testing head 110 causes the insertion of probe tips 180, 182, and 184 into tapered recess 80. The insertion is limited by the lip 188 of stop block 186 which engages surface 190 (see FIG. 3) of razor blade magazine 10. For the embodiment illustrated, a structurally sound hinge web 64 offers sufficient resistance to insertion of the probe tips into tapered recess 80 to the extent permitted by stop block 186 for the probes to be forced upward so that contacts 142 engage tips 144 of studs 146, thereby closing the circuits between leads 138 and 148. A weakened hinge web 64, caused for example by one or more broken ribs 68, will offer less resistance to the insertion of a probe tip, and consequently the probe does not move upward a distance sufficient for contact 142 to engage the corresponding stud tip 144. The failure to make an electrical connection between leads 138 and 148 when there is a defective hinge web 64 is used to energize apparatus for automatically discarding the defective razor blade magazine. The distance between lip 188 of stop block 186 and the extreme lower ends of probe tips 180, 182, and 184 is chosen such that overinsertion of the probes into the tapered recess 80 and resultant contact of points 142 with tip 144 of stud 146 even when the hinge web 64 is defective, is avoided.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. The method of testing the integrity of a hinge web section which connects two spaced members of an integral molded resilient structure that define two opposed walls of a tapered recess, said web hinge section connecting said two members at the narrower end of said recess, comprising the steps of inserting a plurality of probes between said two spaced members into said recess simultaneously to move one of said spaced members relative to the other member to stress said hinge web section at a plurality of specific points along the length of the recess and generating a hinge web satisfactory signal in response to the movement of each probe greater than a predetermined distance in response to the flexure resistance of said hinge web section.

2. The method as claimed in claim 1 wherein each said probe includes associated biasing means and further including the step of graduating the biasing force applied to each said probe by its associated biasing means as a function of the position of the probe along the length of the recess.

3. The method as claimed in claim 1 and further including the step of graduating the distance said probes must move before said hinge web satisfactory signal is generated as a function of the positions of the probes along the length of the recess.

References Cited

UNITED STATES PATENTS

| 1,584,320 | 5/1926 | Owens | 73—87 |
| 2,386,472 | 10/1945 | Kaemmerling | 73—100 |
| 3,498,120 | 3/1970 | MacMillan | 73—81 |
| 3,421,369 | 1/1969 | Freehauf | 73—161 |

RICHARD C. QUEISSER, Primary Examiner

M. SMOLLAR, Assistant Examiner

U.S. Cl. X.R.

73—81, 85

PO-1050
(5/69)

UNITED STATES PATENT OFFICE
CERTIFICATE OF CORRECTION

Patent No. 3,618,371          Dated November 9, 1971

Inventor(s) Frank S. Martin

It is certified that error appears in the above-identified patent and that said Letters Patent are hereby corrected as shown below:

In the Title: delete "AND APPARATUS".

Column 1, line 67, change "member sto" to --members to--.

Signed and sealed this 13th day of June 1972.

(SEAL)
Attest:

EDWARD M. FLETCHER, JR.          ROBERT GOTTSCHALK
Attesting Officer          Commissioner of Patents